(12) United States Patent
Leigh et al.

(10) Patent No.: US 7,890,968 B2
(45) Date of Patent: Feb. 15, 2011

(54) OPTICAL DISC DEVICE HAVING TWO OPTOMECHANICAL MECHANISMS

(75) Inventors: David Leigh, Corvallis, OR (US); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 939 days.

(21) Appl. No.: 11/627,716

(22) Filed: Jan. 26, 2007

(65) Prior Publication Data

US 2008/0184278 A1 Jul. 31, 2008

(51) Int. Cl.
*G11B 7/085* (2006.01)
*G11B 21/02* (2006.01)

(52) U.S. Cl. .................. 720/663; 347/242; 369/195

(58) Field of Classification Search .............. 347/224, 347/242, 245, 256, 257, 262, 263, 238, 264; 369/195, 199; 720/659, 663, 676, 677
See application file for complete search history.

(56) References Cited

U.S. PATENT DOCUMENTS

| 4,058,834 | A | * | 11/1977 | Miyaoka ............... 369/111 |
| 5,105,418 | A | * | 4/1992 | Kenmotsu et al. ........... 369/195 |
| 5,251,201 | A | * | 10/1993 | Nomura ................ 369/195 |
| 5,521,899 | A | * | 5/1996 | Taki ..................... 720/662 |
| 5,754,509 | A | * | 5/1998 | Miyazaki et al. ......... 369/53.29 |
| 6,021,100 | A | * | 2/2000 | Fujita .................. 369/13.11 |
| 6,055,222 | A | * | 4/2000 | Knight .................. 369/13.13 |
| 6,188,665 | B1 | * | 2/2001 | Furusawa ................ 720/663 |
| 6,240,059 | B1 | * | 5/2001 | Nguyen et al. ............. 369/199 |
| 6,407,975 | B1 | * | 6/2002 | Takishima ............ 369/112.29 |
| 6,801,487 | B2 | * | 10/2004 | Anderson .............. 369/47.12 |
| 7,172,991 | B2 | * | 2/2007 | Anderson et al. ........... 503/206 |
| 7,270,865 | B2 | * | 9/2007 | Gore ..................... 428/64.4 |
| 7,538,788 | B2 | * | 5/2009 | Hanks et al. ............. 347/224 |
| 2002/0122378 | A1 | * | 9/2002 | Kubo ..................... 369/273 |
| 2002/0191517 | A1 | * | 12/2002 | Honda et al. ........... 369/53.29 |
| 2003/0108708 | A1 | | 6/2003 | Anderson et al. |
| 2003/0142613 | A1 | * | 7/2003 | Anderson .............. 369/125 |
| 2003/0161224 | A1 | * | 8/2003 | Anderson et al. ........ 369/30.58 |
| 2005/0046692 | A1 | * | 3/2005 | Bronson .................. 347/224 |
| 2005/0169115 | A1 | * | 8/2005 | Nagano et al. ............. 369/7 |

(Continued)

FOREIGN PATENT DOCUMENTS

JP 01109571 A * 4/1989

(Continued)

OTHER PUBLICATIONS

English machine translation of JP 2006-040470 A to Wada, puiblished on Feb. 9, 2006.*

(Continued)

*Primary Examiner*—William J Klimowicz

(57) ABSTRACT

An optical disc device has a first optomechanical mechanism, a second optomechanical mechanism, and a sled mechanism. The first optomechanical mechanism is located under an optical disc insertable into the optical disc device to optically access a bottom surface of the optical disc. The second optomechanical mechanism is located over the optical disc insertable into the optical disc device to optically access a top surface of the optical disc. The first and the second optomechanical mechanism are disposed on the sled mechanism. Movement of the sled mechanism results in both the first and the second optomechanical mechanism moving radially in relation to the optical disc.

17 Claims, 7 Drawing Sheets

U.S. PATENT DOCUMENTS

| | | | |
|---|---|---|---|
| 2005/0266413 A1* | 12/2005 | Shivji et al. | 435/6 |
| 2007/0070176 A1* | 3/2007 | Van Brocklin | 347/262 |
| 2007/0252889 A1* | 11/2007 | Hanks et al. | 347/238 |
| 2008/0101184 A1* | 5/2008 | Van Brocklin et al. | 369/47.49 |

FOREIGN PATENT DOCUMENTS

| | | | | |
|---|---|---|---|---|
| JP | 01128271 | A | * | 5/1989 |
| JP | 01134511 | A | * | 5/1989 |
| JP | 02156452 | A | * | 6/1990 |
| JP | 03280227 | A | * | 12/1991 |
| JP | 06076307 | A | * | 3/1994 |
| JP | 06325428 | A | * | 11/1994 |
| JP | 10011827 | A | * | 1/1998 |
| JP | 11195235 | A | * | 7/1999 |
| JP | 11238307 | A | * | 8/1999 |
| JP | 2001126282 | A | * | 5/2001 |
| JP | 2002216396 | A | * | 8/2002 |
| JP | 2005071566 | A | * | 3/2005 |
| JP | 2006040470 | A | * | 2/2006 |

OTHER PUBLICATIONS

U.S. Appl. No. 11/553,883, filed Oct. 27, 2006, Leigh et al.

* cited by examiner

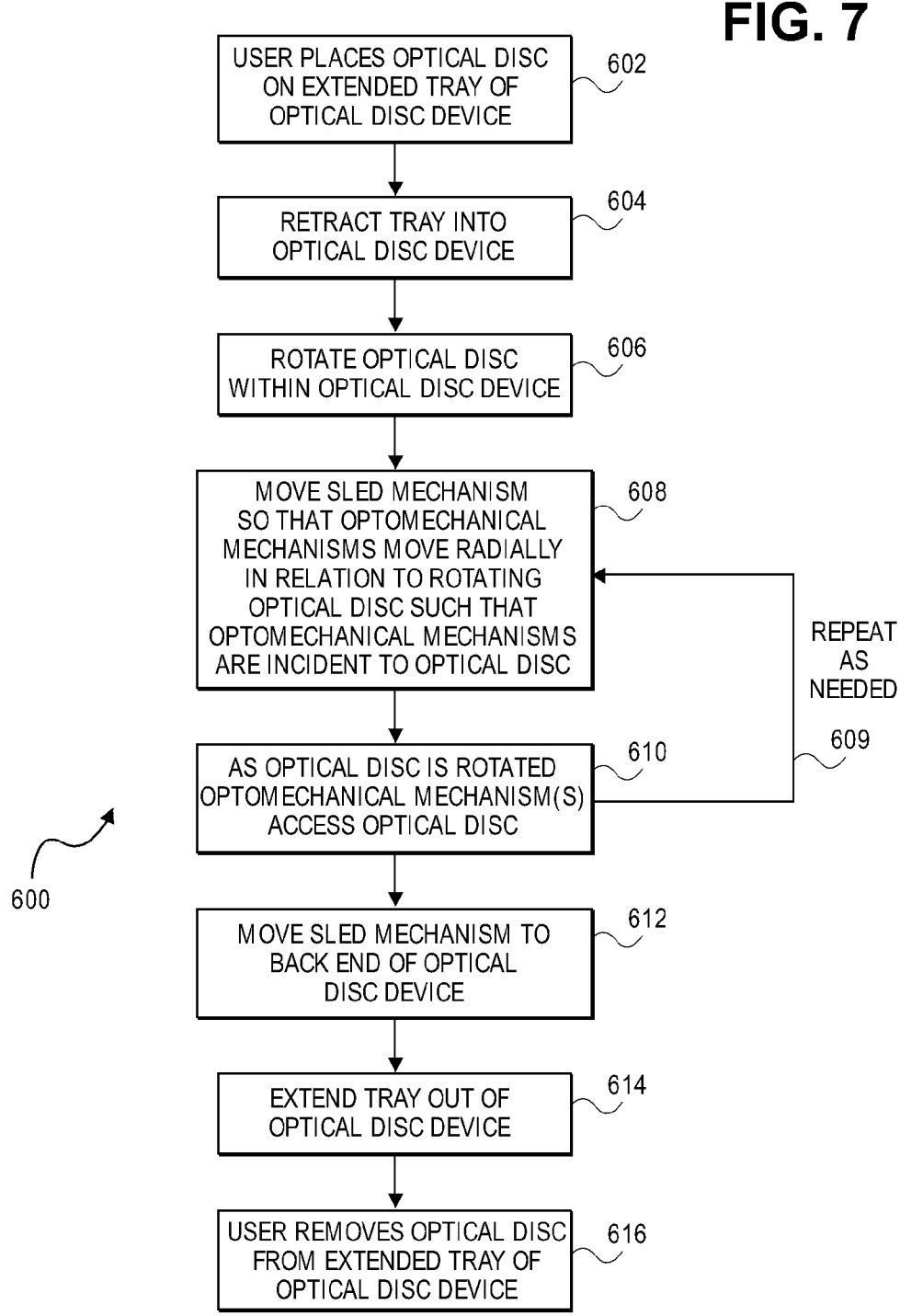

OPTICAL DISC DEVICE HAVING TWO OPTOMECHANICAL MECHANISMS

BACKGROUND

Many types of optical discs include a data area and a label area. The data area is where the data is written to, whereas the label area allows the user to label the optical disc. A laser or another type of optical beam can be used to read from and/or write to the data area and the label area of an optical disc. For example, in the patent application entitled "Integrated CD/DVD Recording and Label," filed on Oct. 11, 2001, assigned Ser. No. 09/976,877, and issued as U.S. Pat. No. 7,172,991, a type of optical disc is disclosed in which a laser or other optical beam can be used to write to the label area of an optical disc.

Conventionally, a user inserts an optical disc into an optical disc drive so that the data area of the optical disc is incident to the optical beam, for optical writing of data to the data side of the optical disc. Thereafter, the user may remove the optical disc from the optical disc drive, flip it over, and reinsert the optical disc into the drive so that the label area of the optical disc is incident to the optical beam, for optical writing of human-readable markings to the label side of the optical disc. However, this process of inserting an optical disc into the optical disc drive, writing data to the disc, removing the disc, flipping the disc over, reinserting the optical disc into the drive, and labeling the disc can be inconvenient.

BRIEF DESCRIPTION OF THE DRAWINGS

FIG. 7 is a flowchart of a method, according to an embodiment of the invention.

DETAILED DESCRIPTION

Figure 1:
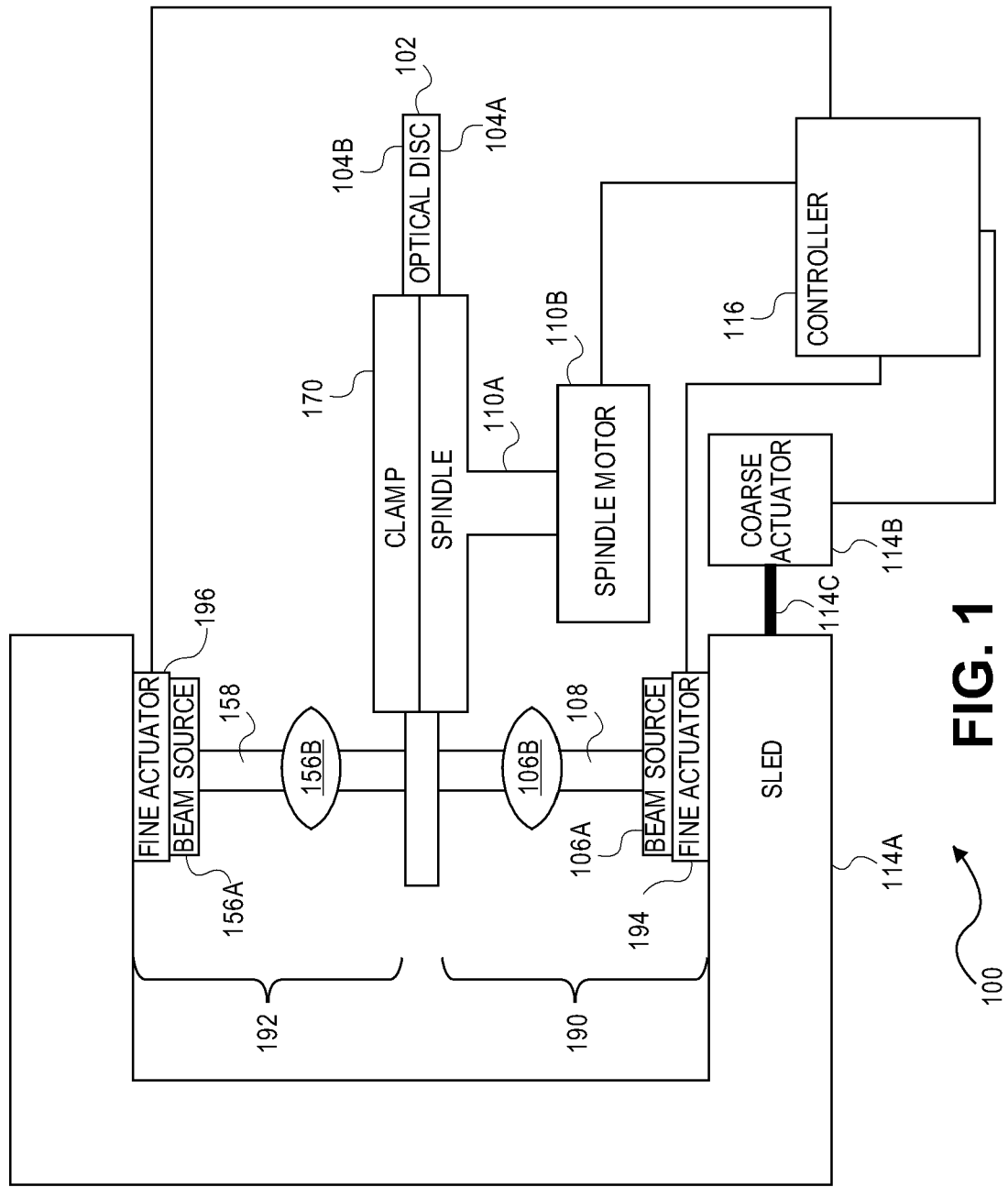
FIG. 1 is a diagram of an optical disc device, according to an embodiment of the invention.

FIG. 1 shows an optical disc device 100, according to an embodiment of the invention. The optical disc device 100 is for reading from and/or writing to an optical disc 102 inserted into the optical disc device 100 and that has a label area and a data area. In one embodiment, the label area of disc 102 is a label side 104B and the data area is a data side 104A opposite the label side 104B. More specifically, the optical disc device 100 is for reading from and/or writing to an optically writable label side 104B of the optical disc 102, and/or an optically writable data side 104A of the optical disc 102, which are collectively referred to as the sides 104 of the optical disc 102.

The optically writable data side 104A of the optical disc 102 includes a data region on which data may be optically written to and/or optically read by the optical disc device 100. The data side 104A is thus the side of the optical disc 102 to which binary data readable by the optical disc device 100 and understandable by a computing device is written, and can be written by the optical disc device 100 itself. For instance, the data side 104A may be the data side of a compact disc (CD), a CD-readable (CD-R), which can be optically written to once, a CD-readable/writable (CD-RW), which can be optically written to multiple times, and so on. The data side 104A may further be the data side of a digital versatile disc (DVD), a DVD-readable (DVD-R), or a DVD that is readable and writable, such as a DVD-RW, a DVD-RAM, or a DVD+RW. The data side 104A may also be the data side of a high-capacity optical disc, such as a Blu-ray optical disc, a High Definition (HD) DVD optical disc, and so on. Furthermore, there may be a data region on each side of the optical disc 102, such that the optical disc is double sided, and such that there is a label region on at least one of the sides of the disc.

The label side 104B is the side of the optical disc 102 to which visible markings can be optically written to realize a desired label image. For instance, the label side 104B may be part of an optical disc that is disclosed in the previously filed patent application assigned Ser. No. 09/976,877, which discloses an optically writable label side of an optical disc. It is noted that in other embodiments at least one of the sides 104A and 104B of the optical disc 102 may have both label regions and data regions.

The optical disc device 100 is depicted in FIG. 1 as including an optomechanical mechanism 190 and an optomechanical mechanism 192. Generally, the optomechanical mechanism 190 is for optically accessing the data side 104A, while the optomechanical mechanism 192 is for optically accessing the label side 104B. Optical accessing in this context can mean optical writing and/or optical reading. For instance, the optomechanical mechanism 190 may be for optically writing data to the data side 104A and/or optically reading data from the data side 104A, whereas the optomechanical mechanism 192 may just be for optically writing a human-readable image to the label side 104B.

The presence of two optomechanical mechanisms 190 and 192 within the optical disc device 100 is advantageous, because it provides for more convenient utilization of the optical disc 102 by a user. For example, the user may insert the optical disc 102 into the optical disc device 100. Once the optical disc 102 has been inserted into the device 100, the user may then control the optical disc device 100, via an attached computing device, for instance, to cause data to be written to the data side 104A by the optomechanical mechanism 190. Thereafter, the user can control the optical disc device 100 to cause human-readable markings to be written to the label side 104B by the optomechanical mechanism 192. That is, because there are two optomechanical mechanisms 190 and 192, the user does not have to remove the optical disc 102 from the device 100, flip it over, and reinsert the disc 102 back into the device 100, after causing data to be written to the data side 104A and before causing data to be written to the label side 104B.

However, it is noted that while embodiments of the invention are substantially described herein in relation to two optomechanical mechanisms 190 and 192, one of which is for writing human-readable markings on the label side 104B and one of which is for writing or reading machine-readable data on the data side 104A, other embodiments of the invention are not so limited. For example, both the optomechanical mechanisms 190 and 192 may be for reading or writing machine-readable data, where both sides 104A and 104B of the optical disc 102 are data sides. Such an embodiment is particularly useful, for instance, in relation to optical discs that store data on both sides. Therefore, it is understood that the description herein that is made in substantial relation to writing human-readable markings on one side of an optical disc and reading or writing machine-readable data on the other side of an optical disc pertains to just one embodiment of the invention, and not all embodiments of the invention.

The optomechanical mechanism 190 includes a beam source 106A and an objective lens 106B, which are collectively referred to as the optical mechanism 106. Similarly, the optomechanical mechanism 192 includes a beam source 156A and an objective lens 156B, which are collectively referred to as the optical mechanism 156. The optical mechanism 106 is particularly described herein, but those of ordinary skill within the art can appreciate that the optical mechanism 156 operates similarly. The primary difference between the optical mechanisms 106 and 156 is that the former is for optically accessing the data side 104A, whereas the latter is for optically accessing the label side 104B.

The beam source 106A generates an optical beam 108 that is focused by the objective lens 106B onto the optical disc 102. In some embodiments the optical beam source 106A may be a laser beam source, such that the optical beam 108 is a laser beam. The optical mechanism 106 may include other components, in addition to and/or in lieu of those depicted in FIG. 1. For example, the optical mechanism 106 may include one or more mirrors, as well as a photodetector, so that reflections of the beam 108 off the optical disc 102 can be directed to the photodetector by the mirrors and detected by the photodetector. As another example, the optical mechanism 106 may include polarizing beam splitters, quarter-wave plates, voice coils, and so on.

The optical disc device 100 further includes a spindle 110A and a spindle motor 110B, which are collectively referred to as the first motor mechanism 110 of the optomechanical mechanism 190. The optical disc device 100 also includes a clamp 170, which may be referred to as a spindle clamp, a disc clamp, or a hub. The optical disc is rotatably situated between the spindle 110A and the clamp 170. The spindle motor 110B rotates the spindle 110A, such that the optical disc 102 correspondingly rotates. The first motor mechanism 110 may include other components besides those depicted in FIG. 1. For instance, the first motor mechanism 110 may include a rotary encoder or another type of encoder to provide for control of the spindle motor 110B and the spindle 110A.

The optical disc device 100 also includes a sled 114A, a coarse actuator 114B, and one or more rails 114C, which are collectively referred to as the second motor mechanism 114. The second motor mechanism 114 moves the optical mechanism 106 to radial locations relative to a surface of the optical disc 102. The sled 114A may also be referred to more as a support, and the terms sled and support can be used synonymously. The coarse actuator 114B is or includes a motor that causes the sled 114A, and hence fine actuators 194 and 196 and the optical mechanisms 106 and 156 situated on the sled 114A, to move radially relative to the optical disc 102 on the rails 114C. The functions of the fine actuators 194 and 196 are described later in the detailed description.

The coarse actuator 114B thus provides for coarse or large radial movements of the fine actuators 194 and 196 and the optical mechanisms 106 and 156. The optomechanical mechanism 190 and 192 move in unison with one another, since both are disposed on the sled 114A. The second motor mechanism 114 may include other components besides those depicted in FIG. 1. For instance, the second motor mechanism 114 may include a linear encoder or another type of encoder to provide for control of the coarse actuator 114B and the sled 114A. Furthermore, either or both of the motor mechanisms 110 and 114 may be considered as the movement mechanism of the optomechanical mechanisms 190 and 192.

The optomechanical mechanism 190 includes the fine actuator 194, whereas the optomechanical mechanism 192 includes the fine actuator 196. The fine actuators 194 and 196 also are or include motors, and cause their corresponding optical mechanisms 106 and 156 to move radially relative to the optical disc 102 on the sled 114A. The fine actuators 194 and 196 provide for fine or small movements of the optical mechanisms 106 and 156 while the sled 114A remains stationary.

It is noted that the utilization of fine actuators 194 and 196 and a coarse actuator 114B is representative of one, but not all, embodiments of the invention. That is, to radially move the optical mechanism 106 in relation to the optical disc 102, the embodiment of FIG. 1 uses both fine actuators 194 and 196 and a coarse actuator 114B. However, in other embodiments, other mechanisms can be used to radially move the optical mechanisms 106 and 156 in relation to the optical disc 102, which do not require the fine actuators 194 and 196 and the coarse actuator 114B. For instance, a single actuator or other type of motor may alternatively be used to radially move and position the optical mechanisms 106 and 156 in relation to the optical disc 102.

The optical disc device 100 is finally depicted in FIG. 1 as including a controller 116. The controller 116 may be implemented in software, hardware, or a combination of software and hardware. The controller 116 controls movement of the spindle motor 110B, and thus controls rotation of the optical disc 102 on the spindle 110A, such as the angular velocity of the rotation of the optical disc 102. The controller 116 also controls the coarse actuator 114B, and thus movement of the sled 114A on the rails 114C.

The controller 116 further controls the fine actuators 194 and 196, and thus movement of the beam sources 106A and 156A on the sled 114A. The controller 116 may further include other components besides those depicted in FIG. 1. For instance, the controller 116 can be responsible for turning on and off, and focusing, the optical beams 108 and 158, via control of the beam sources 106A and 156A and the objective lens 106B and 156B. Furthermore, as can be appreciated by those of ordinary skill within the art, the components depicted in the optical disc device 100 are representative of one embodiment of the invention, and do not limit all embodiments of the invention.

The optical disc device 100 thus has a single sled 114A on which both the optomechanical mechanisms 190 and 192 are disposed. When the sled 114A is moved on the rails 114C via the coarse actuator 114B, both the optomechanical mechanisms 190 and 192 are moved radially in relation to the optical disc 102. The fine actuators 194 and 196 permit fine movements of the beam sources 106A and 156A, respectively, on the sled 114A, but it is the movement of the sled 114A via the coarse actuator 114B that permits relatively large movements of the optomechanical mechanisms 190 and 192 themselves in radial relation to the optical disc 102.

Figure 2:
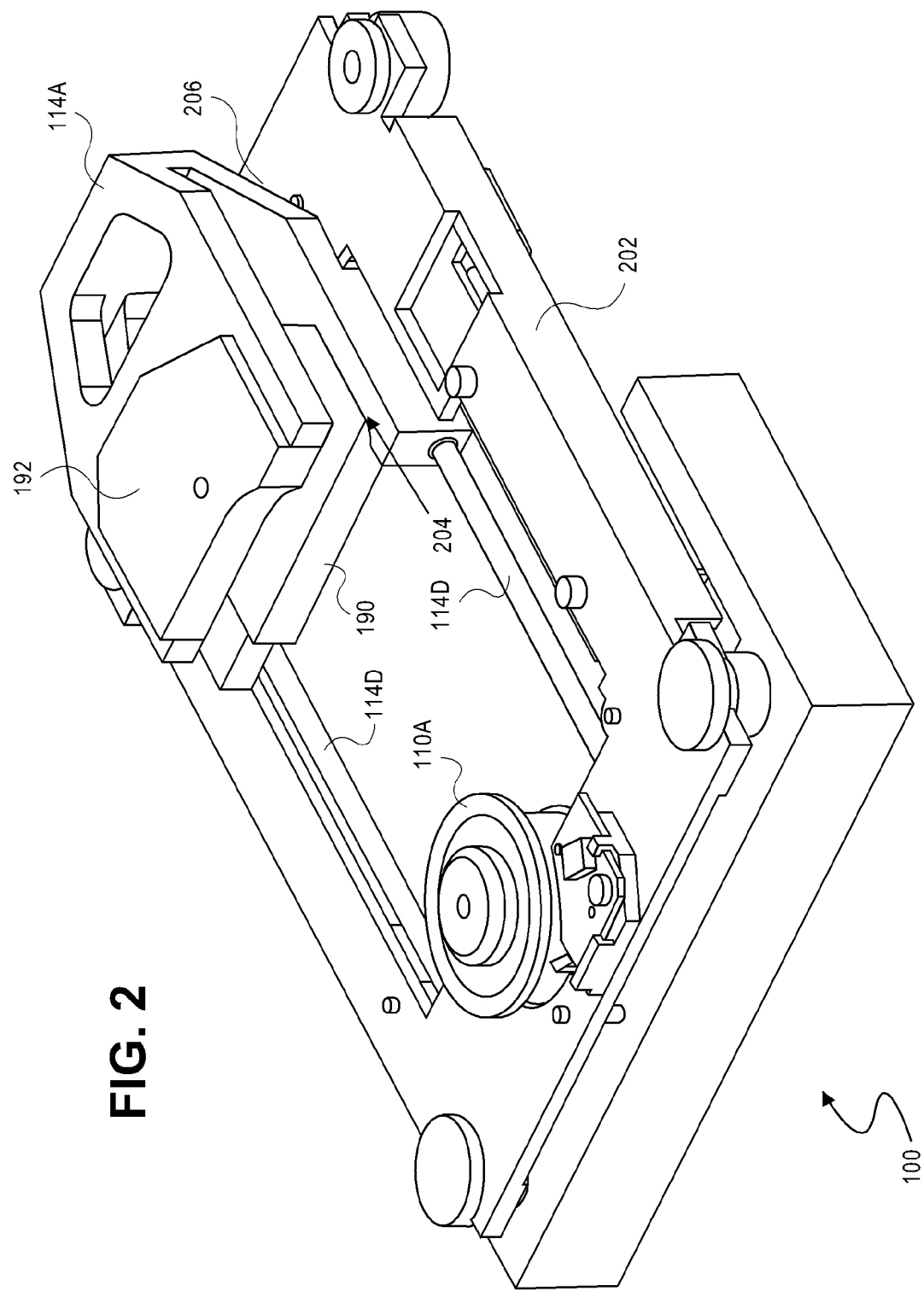
FIG. 2 is a diagram of a top perspective view of an optical disc device, according to an embodiment of the invention.

FIG. 2 shows a top perspective view of a portion of the optical disc device 100 in detail, according to a particular embodiment of the invention. The sled 114A, which may also be referred to as a sled mechanism, is movable along the rails 114D. The optomechanical mechanism 190 is situated on the bottom side of the sled 114A, whereas the optomechanical mechanism 192 is situated on the top side of the sled 114A. The components of the optomechanical mechanisms 190 and 192 as have been described in relation to FIG. 1 are not particularly called out in FIG. 2 for illustrative clarity.

The sled 114A is substantially C-shaped, such that it defines a slot 204. The optical disc 102, which is not depicted in FIG. 2 for illustrative clarity, is clamped between the spindle 110A and the clamp 170, where the clamp 170 is not shown in FIG. 2. The slot 204 enables the sled 114A to move towards the spindle 110A and the clamp 170 such that the optical disc 102 is positioned within the slot 204. As such, the optomechanical mechanism 190 is positioned under the optical disc 102, and the optomechanical mechanism 192 is positioned over the optical disc 102.

As depicted in FIG. 2, however, the sled 114A is in a position along the rails 114D at which it is at a back end of the optical disc device 100. The sled 114A has a defined notch 206 that permits it clear a portion of a frame 202 to which the rails 114D are mounted, or fixed. The frame 202 can be metal, and provides rigidity to the optical disc device 100, among other functionality. Thus, the notch 206 corresponds to the portion of the frame 202 over which the sled 114A is positioned when the sled 114A is located at the back end of the optical disc device 100, away from the optical disc 102 clamped between the clamp 170 and the spindle 110A.

Figure 3:
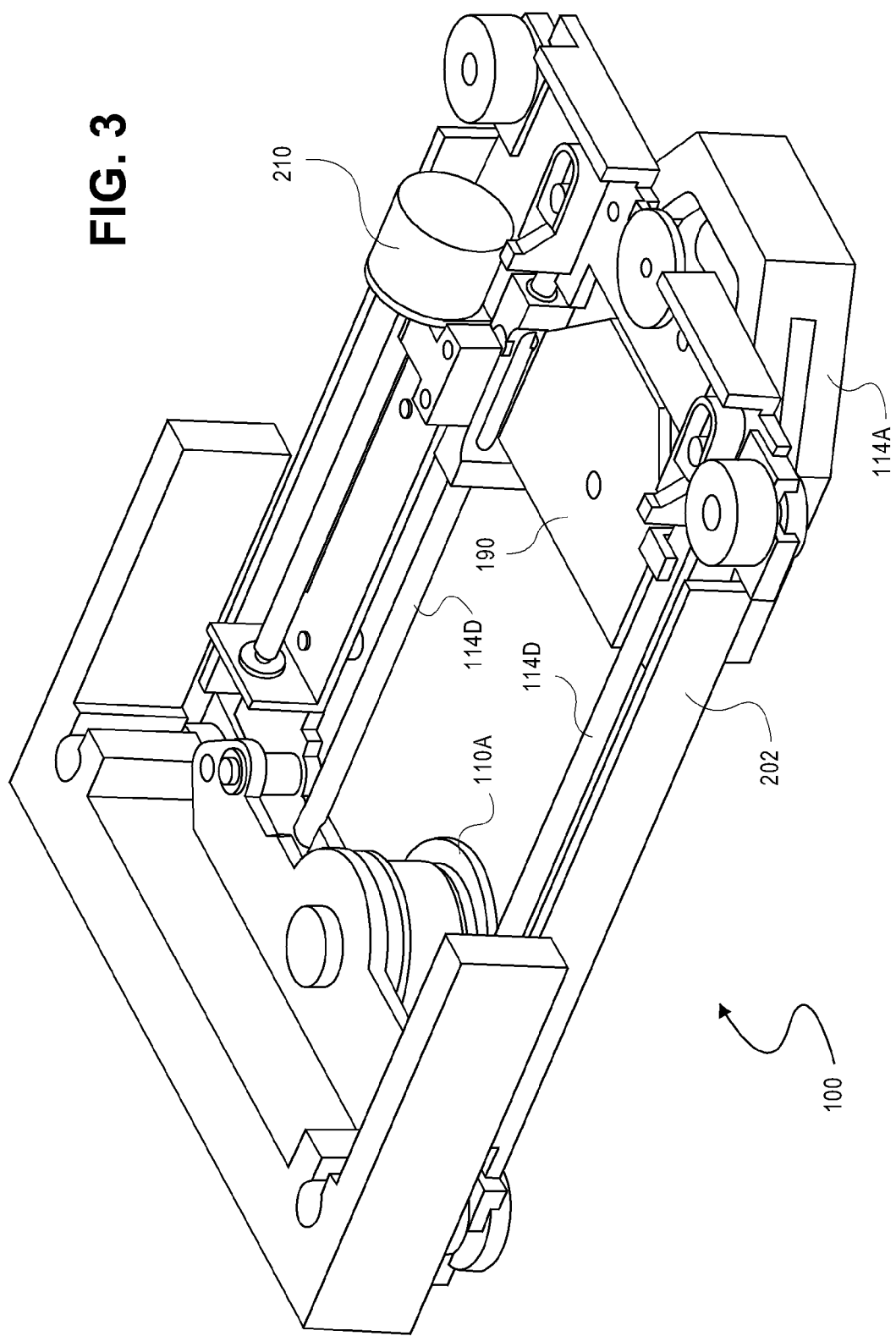
FIG. 3 is a diagram of a bottom perspective view of an optical disc device, according to an embodiment of the invention.

FIG. 3 shows a bottom perspective view of a portion of the optical disc device 100 in detail, according to an embodiment of the invention. As before, the sled 114A is movable along the rails 114D, which are fixed to the frame 202, which can be metal. Just the optomechanical mechanism 190, and not the optomechanical mechanism 192, is visible in FIG. 3. The optical disc 102, which is not depicted in FIG. 3 for illustrative clarity, is clamped between the spindle 110A and the clamp 170, where the clamp 170 is also not shown in FIG. 3.

A lead screw 210 of the optical disc device 100 moves the sled 114A along the rails 114D, as is conventional, as can be appreciated by those of ordinary skill within the art. Thus, turning the lead screw 210 pushes the sled 114A towards the clamp 170 and the spindle 110A or pulls the sled 114A away from the clamp 170 and the spindle 110A. In this embodiment, the lead screw 210 can replace or supplement the coarse actuator 114B of FIG. 1 that has been described.

Figure 4:
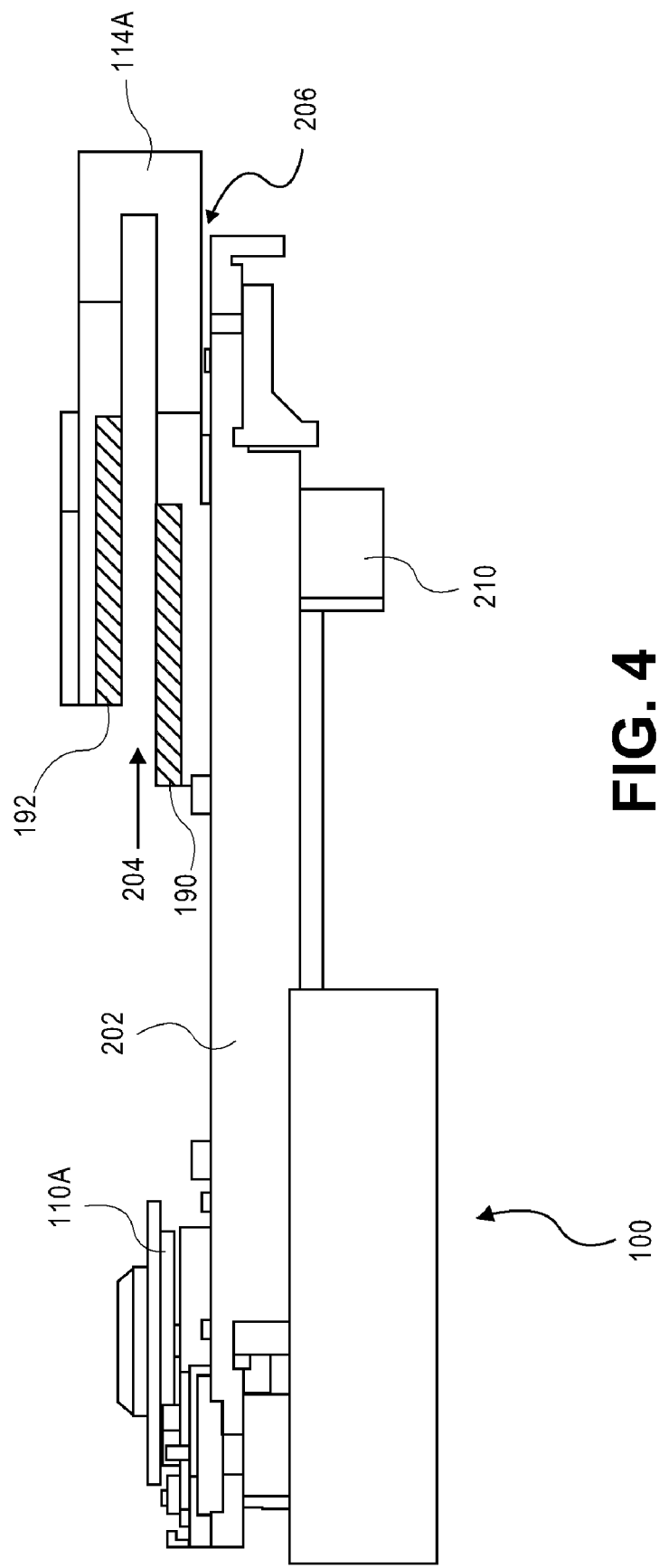
FIG. 4 is a diagram of a cross-sectional side view of an optical disc device, according to an embodiment of the invention.

FIG. 4 shows a side cross-sectional view of a portion of the optical disc device 100 in detail, according to an embodiment of the invention. The slot 204 of the sled 114A is particularly discernable in FIG. 4. To either side of the slot 204 are the optomechanical mechanisms 190 and 192. The sled 114A is movable from left to right, away from the spindle 110A and the clamp 170, and from right to left, towards the spindle 110A and the clamp 170. The clamp 170 is not particularly shown in FIG. 4, however. Also depicted in FIG. 4 is how various components of the optical disc device 100 are mounted to the frame 202. However, the rails 114D cannot be seen in the view of FIG. 4, although the lead screw 210 can. FIG. 4 also shows the notch 206 defined within the sled 114A that permits the sled 114A to clear a portion of a frame 202.

Figure 5:
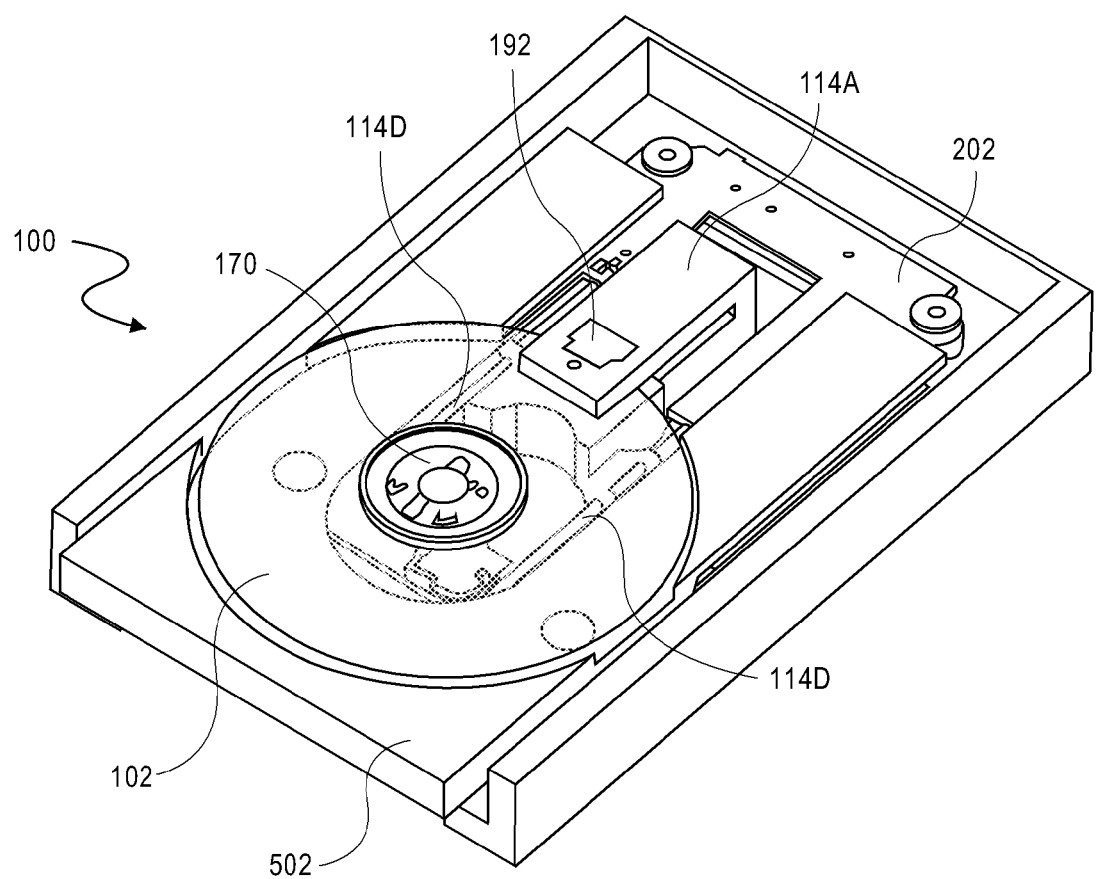
FIG. 5 is another diagram of a top perspective view of an optical disc device, according to an embodiment of the invention.

FIG. 5 shows another top perspective view of a portion of the optical disc device 100 in detail, according to an embodiment of the invention. Particularly, a tray 502 of the optical disc device 100 is shown in FIG. 5. The tray 502 can be extended out of and retracted into the optical disc device 100. When the tray 502 is extended, a user is able to place the optical disc 102 onto the tray 502 or remove the optical disc 102 from the tray 502.

Thus, FIG. 5 shows how the sled 114A is able to move relative to the tray 502, both towards and away from the clamp 170 and the spindle 110A along the rails 114D. The frame 202 is further depicted in FIG. 5. However, the notch 206 of FIG. 2 that is defined by the sled 114A is not shown in FIG. 5 for illustrative convenience. When present, however, the notch 206 enables the sled 114A to clear the frame 202 when the sled 114A is moved to the back end of the optical disc device 100, as has been described.

Figure 6:
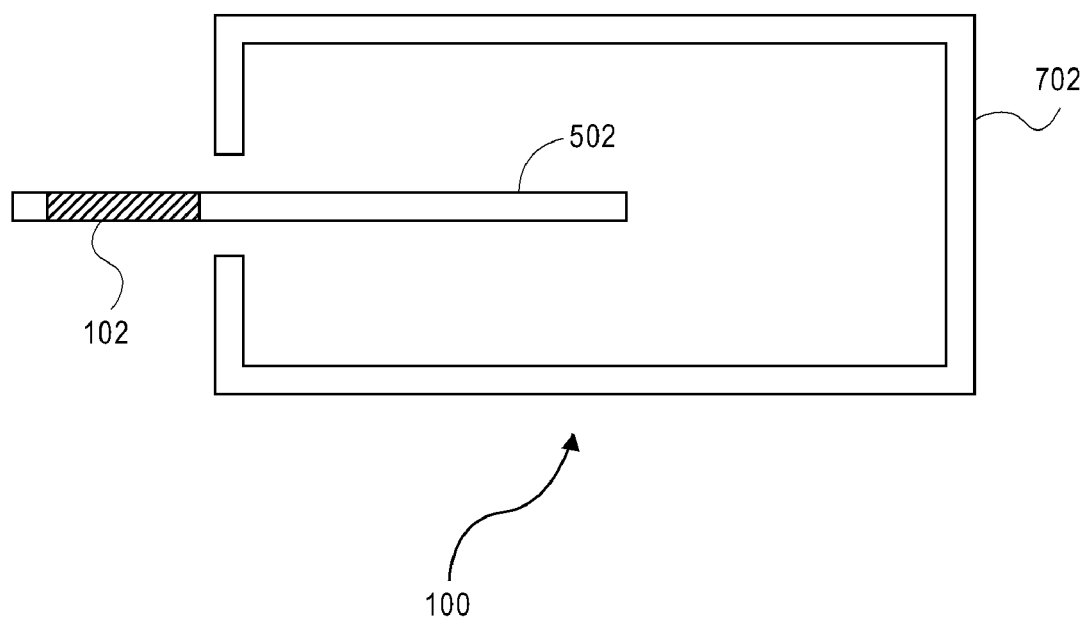
FIG. 6 is another diagram of a cross-sectional side view of an optical disc device, according to an embodiment of the invention.

FIG. 6 shows a rudimentary cross-sectional side view of the optical disc device 100, according to an embodiment of the invention. In particular, FIG. 6 shows that the optical disc device 100 includes an enclosure 702 from which the tray 502 is extendable and into which the tray 502 is retractable. In the extendable position, the tray 502 permits a user to place the optical disc 102 onto the tray 502, or remove the optical disc 102 from the tray 502. In the retracted position, the optical disc 102 is inside the enclosure 702, so that the optomechanical mechanisms 190 and 192 can optically access the optical disc 102 as has been described. The mechanisms 190 and 192, as well as the other components of the optical disc device 100, are not depicted in FIG. 6 for illustrative convenience, but all are housed within the enclosure 702. The enclosure 702 may have a half-height drive form factor, as known within the art, such that the optical disc device 100 is an internal optic disc drive for insertion into a desktop computing device, for example.

Finally, FIG. 7 shows a method 600 of representative usage of the optical disc device 100, according to an embodiment of the invention. Assuming that the tray 502 has been extended out of the optical disc device 100, a user places the optical disc 102 onto the tray 502 of the optical disc device 100 (602). Thereafter, the tray 502 is retracted into and inside the optical device 100 (604), and the optical disc 102 is rotated between the clamp 170 and the spindle 110A via the spindle motor 110B (606).

The sled 114A, or sled mechanism, is moved so that the optomechanical mechanisms 190 and 192 are moved radially in relation to the rotating optical disc 102 such that they are incident to the surfaces 104 of the optical disc 102 (608). As the optical disc 102 rotates, either or both of the optomechanical mechanisms 190 and 192 optically access the optical disc 102 (610), such as writing data or marks to the disc 102, or reading data or marks from the disc 102. The sled 114A is moved as needed so that the optomechanical mechanisms 190 and 192 are able to access all radii of the optical disc 102, as indicated by the arrow 609.

For instance, in one embodiment, the optical disc 102 has to be rotated at a different speed for the optomechanical mechanism 192 to properly access the label surface 104B of the optical disc 102, as compared to the speed at which the optical disc 102 is rotated for the optomechanical mechanism 190 to properly access the data surface 104A of the optical disc 102. Thus, the optical disc 102 may first be rotated at the speed at which the optomechanical mechanism 190 can properly access the data surface 104A. Once the data surface 104A has been accessed as needed by the optomechanical mechanism 190, such that the sled 114A has been moved to all needed radii of the optical disc 102, the optical disc 102 is then rotated at the speed at which the optomechanical mechanism 192 can properly access the label surface 104B. The sled 114A is again moved over all the needed radii of the optical disc 102.

In this embodiment, while the optomechanical mechanism 190 accesses the data surface 104A of the optical disc 102, the optomechanical mechanism 192 may thus not be able to concurrently properly access the label surface 104B. That is, even though the optomechanical mechanism 192 is incident to the label surface 104B at the same time the optomechanical mechanism 190 is incident to the data surface 104A, the optical disc 102 is rotating too quickly (or too slowly) for the optomechanical mechanism 192 to properly optically access the label surface 104B. Likewise, while the optomechanical mechanism 192 accesses the label surface 104B of the optical disc 102, the optomechanical mechanism 190 may not be able to concurrently properly access the data surface 104A. (In another embodiment, however, the optomechanical mechanism 190 may be able to concurrently properly access the data surface 190A.) Again, even though the optomechanical mechanism 190 is incident to the data surface 104A at the same time the optomechanical mechanism 192 is incident to the label surface 104B, the optical disc 102 is rotating too slowly (or too quickly) for the optomechanical mechanism 190 to properly optically access the data surface 104A.

Once the optomechanical mechanisms 190 and 192 have accessed the optical disc 102 as desired, at some point the sled 114A is moved to the back end of the optical disc device 100 (612). In this position, the notch 206 defined by the sled 114A clears the frame 202 as has been described. The tray 502 can then be safely extended from or out of the optical disc device 100 (614). As such, the user is able to remove the optical disc 102 from the extended tray 502 of the optical disc device 100 (616).

At least some embodiments of the invention that have been described provide for advantages over conventional optical disc devices in which there is a single optomechanical mechanism, or in optical disc devices in which there are two optomechanical mechanisms positioned differently than in these embodiments. For instance, the optical disc device 100 may have increased surfaced area and cross-sectional area, which permits increased heat dissipation. Just a single set of rails 114C/114D, and associated other components, is employed for both optomechanical mechanisms 190 and 192, which represents a cost savings as compared to using a set of rails for each optomechanical mechanism.

Furthermore, while the optomechanical mechanism 190 may be used to access the data side of the optical disc 102 and the optomechanical mechanism 192 may be used to access the label side of the optical disc 102, the mechanism 190 may include hardware that also is used when the mechanism 192 accesses the label side. For instance, the optomechanical mechanism 190 may include positioning and speed feedback components, such as various motor encoders, that may also be used when the optomechanical mechanism 192 accesses the label side of the optical disc 102. As such, there are cost savings in this approach as compared to having a set of such components for each of the optomechanical mechanisms 190 and 192.

We claim:

1. An optical disc device comprising:
   a first optomechanical mechanism located under an optical disc insertable into the optical disc device to optically access a bottom surface of the optical disc;
   a second optomechanical mechanism located over the optical disc insertable into the optical disc device to optically access a top surface of the optical disc; and,
   a sled mechanism on which the first and the second optomechanical mechanisms are disposed such that movement of the sled mechanism results in both the first and the second optomechanical mechanism moving radially in relation to the optical disc,
   wherein the sled mechanism has a first end corresponding to where the optical disc is inserted into the optical disc device, and a second end opposite the first end,
   wherein the sled mechanism has a first side and a second side, the second side parallel to the first side, the first side and the second side perpendicular to the first end and the second end,
   wherein the sled mechanism has a top side and a bottom side, such that the first side and the second side are a right side and a left side perpendicular to the top side and the bottom side,
   and wherein the sled mechanism defines a notch disposed at a corner defined by the first side and the second end.

2. The optical disc device of claim 1, wherein the sled mechanism defines a slot within which the optical disc is positioned upon movement of the sled mechanism to move the first optomechanical mechanism under the optical disc and the second optomechanical mechanism over the optical disc.

3. The optical disc device of claim 1, further comprising one or more rails on which the sled mechanism is movably located.

4. The optical disc device of claim 3, further comprising a frame to which the rails are fixed.

5. The optical disc device of claim 4, wherein the notch corresponds to a portion of the frame.

6. The optical disc device of claim 5, wherein the sled mechanism has a position in which the first and the second optomechanical mechanisms are positioned away from the optical disc and the notch of the sled mechanism is positioned over the portion of the frame, at a back end of the optical disc device.

7. The optical disc device of claim 1, further comprising an enclosure in which the first optomechanical mechanism, the second optomechanical mechanism, and the sled mechanism are housed, the enclosure having a half-height device form factor.

8. The optical disc device of claim 1, wherein the first optomechanical mechanism is adapted to at least one of optically read data from and optically write data to the bottom surface of the optical disc, and the second optomechanical mechanism is adapted to at least optically write human-readable markings to the top surface of the optical disc.

9. The optical disc device of claim 1, wherein the notch consists of a flat surface of the sled mechanism, the flat surface of the sled mechanism being at a non-perpendicular angle to both the first side and the second end.

10. The optical disc device of claim 1, wherein the notch is a first notch, and the sled mechanism defines a second notch disposed at a corner defined by the second side and the second end, such that the second notch is opposite the first notch.

11. The optical disc device of claim 10, wherein the first notch is a first flat surface of the sled mechanism, the first flat surface of the sled mechanism being at a non-perpendicular angle to both the first side and the second end, and wherein the second notch is a second flat surface of the sled mechanism, the second flat surface of the sled mechanism being at a non-perpendicular angle to both the second side and the second end.

12. An optical disc device comprising:
   first optomechanical means for optically accessing a bottom surface of an optical disc insertable into the optical disc device;
   second optomechanical means for optically accessing a top surface of the optical disc insertable into the optical disc device; and,
   sled means for moving both the first and the second optomechanical means in unison moving radially in relation to the optical disc,
   wherein the sled means has a first end corresponding to where the optical disc is inserted into the optical disc device, and a second end opposite the first end, wherein the sled means has a first side and a second side, the second side parallel to the first side, the first side and the second side perpendicular to the first end and the second end, wherein the sled means has a top side and a bottom side, such that the first side and the second side are a right side and a left side perpendicular to the top side and the bottom side, and wherein the sled means defines a notch disposed at a corner defined by the first side and the second end.

13. The optical disc device of claim 12, wherein the sled means defines a slot within which the optical disc is positioned upon movement of the sled means to move the first optomechanical means under the optical disc and the second optomechanical means over the optical disc.

14. The optical disc device of claim 12, further comprising:
one or more rails on which the sled means is movably located; and,
a frame to which the rails are fixed, the notch corresponding to a portion of the frame.

15. The optical disc device of claim 14, wherein the sled means has a position in which the first and the second optomechanical means are positioned away from the optical disc and the notch of the sled means is positioned over the portion of the frame, at a back end of the optical disc device.

16. The optical disc device of claim 15, wherein the sled means has a plurality of additional positions in which the first and the second optomechanical means are positioned incident to the optical disc and the notch of the sled means is positioned away from the portion of the frame.

17. The optical disc device of claim 12, wherein the first optomechanical means is adapted to at least one of optically read data from and optically write data to the bottom surface of the optical disc, and the second optomechanical means is adapted to at least optically write human-readable markings to the top surface of the optical disc.

* * * * *